E. C. Didey,
Feed-Roller for Edging-Saws.
No. 83,047.    Patented Oct. 13, 1868.
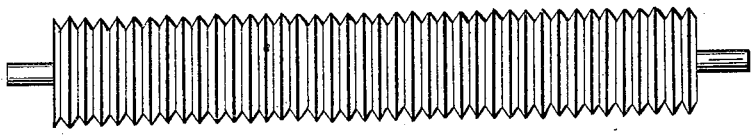
Witnesses.
Wm A Morgan
G C Colton
Inventor.
E C Didey
per Munn & Co
Attorneys

UNITED STATES PATENT OFFICE.

E. C. DICEY, OF MONTAGUE, MICHIGAN.

IMPROVEMENT IN FEEDING-ROLLER FOR CIRCULAR SAWS.

Specification forming part of Letters Patent No. 83,047, dated October 13, 1868.

*To all whom it may concern:*

Be it known that I, E. C. DICEY, of Montague, in the county of Muskegon and State of Michigan, have invented a new and useful Improvement in Feeding-Rollers for Edging-Saws; and I do hereby declare that the following is a full, clear, and exact description thereof, which will enable others skilled in the art to make and use the same, reference being had to the accompanying drawings, forming part of this specification, in which the figure shows a side elevation of a roller provided with my improvement.

The nature of my invention relates to improvements in feeding-rollers for edging-saws and other similar purposes, whereby it is designed to counteract any tendency of the saw to draw the board out of a straight course, as they frequently do when dull, or when, from any cause, they do not run straight in the board.

It consists in providing the surface of the feeding-roller with V-shaped circumferential projections, which press slightly into the surface of the board, and thereby overcome the tendency of the saw to draw it laterally from a straight course, as will be more fully described on reference to the accompanying drawings.

To construct my improved roller, I take a cylindrical roller, as ordinarily constructed, and turn as many V-shaped grooves in it as the length of the same will admit, giving the proper depth and pitch to the same as will make the remaining V-projections of the proper angle to take into the surface of the board sufficiently to prevent lateral movement, while at the same time it has sufficient friction to feed the board forward.

I make either one or both the rollers of a set in this manner, as may be desired.

Having thus described my invention, I claim as new and desire to secure by Letters Patent—

The feed-roller for edging-saws provided with V-shaped grooves and projections at right angles to its axis, for the purpose of preventing lateral movement of the board while being fed to the saws, as herein shown and described.

E. C. DICEY.

Witnesses:
  OPHIR R. GOODIN,
  G. BISCHOFF.